July 21, 1953     M. L. SANDS     2,646,544
AUTOMATIC TEMPERATURE REGULATOR
Filed Sept. 1, 1950
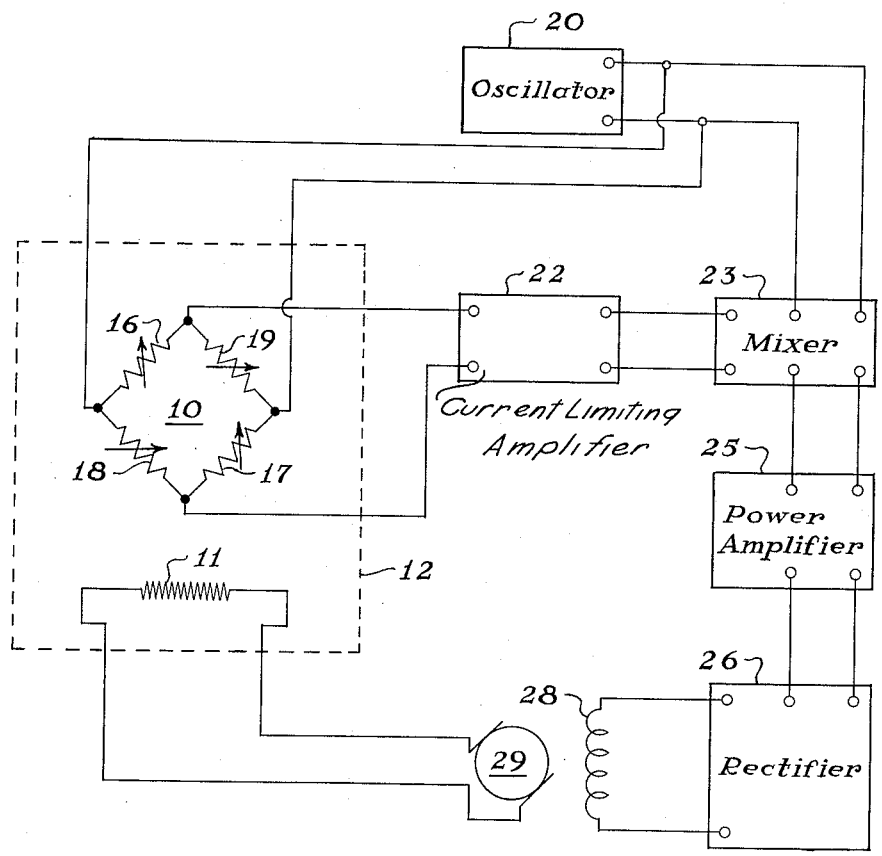
WITNESSES:
INVENTOR:
Matthew L. Sands
BY

Patented July 21, 1953

2,646,544

UNITED STATES PATENT OFFICE 2,646,544

AUTOMATIC TEMPERATURE REGULATOR

Matthew L. Sands, Pasadena, Calif., assignor to the United States of America as represented by the United States Atomic Energy Commission Application September 1, 1950, Serial No. 182,844

1 Claim. (Cl. 322—37)

The present invention relates in general to temperature control systems and, more particularly, to a very sensitive control system having the capability of maintaining a selected temperature within a minute fraction of a degree.

The invention utilizes a Wheatstone bridge circuit in a novel manner which includes the use of two high-temperature and two low-temperature coefficient resistors so connected that, upon the impression thereon of an alternating potential to one pair of opposing apices, a reversal in phase of potential is obtained between the remaining pair of apices upon a change in temperature through the temperature of balance of the bridge. The potential derived from the bridge is mixed with the applied potential thereby giving either an algebraic sum of or algebraic difference between the mixed potentials depending on the direction of drift of the temperature from the temperature of balance. The resultant potential is amplified, rectified and finally utilized to control a temperature-restoring heat source. It is found that the apparatus of this invention is capable of maintaining a selected temperature within much closer limits than the thermal bridge arrangements hitherto available in the art.

It is therefore an object of the present invention to provide an improved temperature control apparatus.

It is a further object of this invention to provide heat-control apparatus having extreme precision.

It is still another object of this invention to provide heat-control apparatus including a Wheatstone bridge wherein the voltage output of the bridge reverses in phase upon a change in temperature through the selected temperature.

Still another object is the provision of heat-control apparatus in which a norm value of direct potential is generated at the selected temperature and large increments of potential are added to or subtracted from said norm value corresponding to small increments in a corresponding direction of temperature from the selected value.

These and other objects and advantages will appear from the description of a preferred embodiment of the invention illustrated in the accompanying drawing and made a part of the specification.

The drawing shows, in schematic form, the resistance bridge together with the remaining components of a heat-producing and temperature-restoring system.

Referring to the drawing, a Wheatstone bridge 10 is shown together with a heating element 11 in a heat enclosure or oven 12. The Wheatstone bridge consists of a pair of high-temperature coefficient resistors 16 and 17 and a pair of low-temperature coefficient resistors 18 and 19. An oscillator 20 capable of generating any convenient frequency of alternating potential is connected across two opposing junctions of the bridge. The two remaining junctions of the bridge are connected to an amplifier 22. The amplifier 22 and a supplemental output of generator 20 are fed into a mixer 23. The phase of the potential output of bridge is compared by the mixer 23 with the phase of the potential generated by oscillator 20.

At a selected temperature, the bridge is balanced by adjusting the resistance arms so that no energy is put out by the bridge.

It follows that in one direction of unbalance of the bridge, the output of the bridge will be in phase with the output potential of the oscillator so that an increased algebraic sum of potential is produced by the mixer. Conversely, it follows that unbalance of the bridge in the opposite direction results in an algebraic difference of potential produced by the mixer. The output of the mixer is fed to a power amplifier 25. The amplified alternating power generated in power amplifier 25 is impressed on rectifier 26 to thereby generate a unidirectional potential which is proportionate to the state of unbalance of the bridge. The unidirectional potential thus derived is impressed on the field 28 of a generator 29 which generates the energy for heating the oven resistance element 11.

The apparatus described operates to maintain a uniform selected temperature by adding or subtracting increments of heating energy to remove any deviation of temperature from the selected value. The apparatus is adjusted so that substantially the proper amount of heating power is determined by the magnitude of the fixed signal from the oscillator 20. At the selected temperature, the bridge is balanced so that there is no signal output from the voltage amplifier 22 and the power supplied to the motor-generator set is unaffected. Drift of the temperature in a negative direction causes an amplified off-balance bridge signal to be added in phase with the fixed signal from the oscillator and the excitation of the generator is therefore increased. On the other hand, drift of the temperature in a positive direction causes generation of a signal from the bridge in the opposite phase which signal is effectively subtracted from the oscillator fixed signal with consequent reduction of excitation of the generator. The drive motor speed can be controlled instead of generator excitation by reversing the connections from the bridge to the mixer.

It is desired that a conventional automatic volume control system be incorporated in the amplifier 22 in any well-known manner to prevent over-loading of the power amplifier 25 if the temperature deviates from the selected temperature more than a selected amount, such as may occur, for example, when first warming up the enclosure 12. In addition, this automatic amplitude control has been found desirable to prevent the bridge output from becoming greater than the oscillator fixed signal because if this condition occurred as a result of too high a temperature, the heating power would increase in proportion to deviation, thus resulting in a runaway condition.

It has been found that with the use of nickel wire material for the bridge resistors that the temperature of the enclosure is easily held to within one hundredth of one degree of the selected temperature.

It is apparent that, although the resistance bridge and associated apparatus has been described in relation to an enclosure or oven, it is not necessarily limited to such use, but is applicable to any situation requiring the maintenance of a constant temperature.

It is desirable, therefore, that it be understood that the invention is not limited to the exact form shown and described herein, but includes all forms and modifications of the invention which come within the scope of the appended claim.

What is claimed is:

In a temperature control system, a Wheatstone bridge circuit having an opposed pair of high-temperature equal coefficient elements connected in series with an opposed pair of low-temperature equal coefficient elements, a source of alternating potential, means electrically connecting the source of alternating potential to two opposed junctions of the bridge, means for balancing the bridge for zero potential difference between the remaining opposed junctions of the bridge at a selected temperature, a voltage amplifier including automatic amplitude limiting means, means electrically connecting the input of said voltage amplifier across the said remaining opposed junctions of the bridge, a mixer circuit, means connecting the input of the mixer circuit to the output of said voltage amplifier and to said source of alternating potential, a power amplifier, means connecting the input of the power amplifier to the output of the mixer circuit, rectifier means electrically connected to the output of said power amplifier, an electrical generator having a field excitation winding; means electrically connecting in series the output of said power amplifier, said rectifying means, and said generator field excitation winding whereby said generator excitation winding causes said generator to deliver more or less current corresponding to a decrease or increase of temperature from said selected value of temperature.

MATTHEW L. SANDS.

References Cited in the file of this patent

UNITED STATES PATENTS

| Number | Name | Date |
|---|---|---|
| 2,093,745 | Westell | Sept. 21, 1937 |
| 2,126,398 | Knowles | Aug. 9, 1938 |
| 2,425,009 | Shepherd | Aug. 5, 1947 |
| 2,429,827 | Lamm | Oct. 28, 1947 |
| 2,462,207 | Mershon | Feb. 22, 1949 |
| 2,553,060 | Miner | May 15, 1951 |
| 2,573,041 | May | Oct. 30, 1951 |
| 2,579,001 | Jeffers | Dec. 18, 1951 |